United States Patent [19]

Yoshihara

[11] Patent Number: 5,253,327
[45] Date of Patent: Oct. 12, 1993

[54] OPTIMIZATION APPARATUS

[75] Inventor: Takafumi Yoshihara, Hachioji, Japan

[73] Assignee: Olympus Optical Co., Ltd., Tokyo, Japan

[21] Appl. No.: 756,467

[22] Filed: Sep. 9, 1991

[30] Foreign Application Priority Data

Sep. 28, 1990 [JP] Japan .................... 2-257106

[51] Int. Cl.$^5$ .................. G06F 15/18; G06F 15/16
[52] U.S. Cl. .......................... 395/22; 395/24
[58] Field of Search ................ 395/24, 20, 22

[56] References Cited

U.S. PATENT DOCUMENTS

| | | | |
|---|---|---|---|
| 4,660,166 | 4/1987 | Hopfield | 364/807 |
| 4,862,406 | 8/1989 | Fisher | 364/807 |
| 4,979,124 | 12/1990 | Sachse et al. | 364/507 |

FOREIGN PATENT DOCUMENTS 2-81257 3/1990 Japan.
2-210574 8/1990 Japan.

OTHER PUBLICATIONS

Kazmierczak et al., "Adaptive Systems in Pattern Recognition," IEEE Trans. Electronic Computers, Dec. 1963, 822–835.
Steinbuch et al., "Learning Matrices and Their Applications", IEEE Trans. Electronic Computers, Dec. 1963, 846–862.
Nasrabadi et al., "Vector Quantization of Images Based Upon the Kohonen Self-Organizing Feature Maps", IEEE Intl. Conf. on Neural Networks, Jul. 1988, I-10-1-I-108.
Moopenn et al., "A Neural Network for Euclidean Distance Minimization", IEEE Intl. Conf. on Neural Networks, Jul. 1988, II-349-II-356.

Primary Examiner—Michael R. Fleming
Assistant Examiner—Robert W. Downs
Attorney, Agent, or Firm—Frishauf, Holtz, Goodman & Woodward

[57] ABSTRACT

An optimization apparatus using a layered neural network having an input layer formed of input units and supplied with input data and an output layer formed of output units connected to the individual input units with specified synaptic weights, which comprises a calculator circuit for calculating, for each output unit, the degree of similarity between the input data and the synaptic weight as well as the evaluation function value by causing the optimization problem to correspond to the fired units in the output layer, a detector for detecting the best matching optimum output unit on the basis of the output of the calculator circuit, and a self-organization circuit for changing the synaptic weights of a group of the output units associated with the optimum unit detected by the detector.

10 Claims, 4 Drawing Sheets

OPTIMIZATION APPARATUS

BACKGROUND OF THE INVENTION

1. Field of the Invention

This invention relates to an optimization apparatus used to solve optimization problems such as a traveling-salesman problem and an n-queen problem.

2. Description of the Related Art

Optimization problems include the problem of optimizing the module arrangement in an LSI in terms of combination, taking into account an overall wiring length and other factors, and the problem of allocating intercommunicative processes to processors. They also include restoration, edge extraction, binary representation in the field of image processing as well as various problems related to graph theory.

An apparatus suitable for solving such optimization problems is disclosed in U.S. Pat. No. 4,660,166 (Hopfield). This apparatus solves an optimization problem by assigning the minimum point of the energy function as the optimum solution on the basis of the nature that an energy function for an interconnection type neural network with feedback but no layer structure decreases with state transition. However, such an energy function has many local minimums, so that it is difficult to approach the true optimum solution. To overcome this drawback, another model has been proposed which allows probabilistic state transition, thereby enabling simulated annealing techniques to improve convergence at the optimum solution.

Even with such techniques, however, it takes an enormously long time to obtain the optimum solutions.

A data processing apparatus to obtain the combination optimum solution, an improved version of the above U.S. patent, is disclosed in Published Unexamined Japanese Patent Application No. 2-210574 (Hitachi). In addition, a task allocation apparatus, an optimization apparatus similar to the foregoing U.S. patent, is disclosed in Published Unexamined Japanese Patent Application No. 2-81257 (Toshiba). These prior art apparatuses both use an interconnection type neural network as in the above U.S. patent. Therefore, with conventional optimization apparatus, it is very difficult to obtain the optimum solution to an optimization problem at a high speed with a high accuracy.

SUMMARY OF THE INVENTION

To overcome the aforementioned disadvantages, it is an object of the present invention to provide an optimization apparatus capable of obtaining the optimum solution for an optimization problem at a high speed with a high accuracy, using the self-organization function of a layered neural network.

In the present invention, an optimization apparatus comprises a neural network having an input layer formed of input units and supplied with input data and an output layer formed of output units connected to the individual input units with specified synaptic weights. This optimization apparatus comprises calculating means for calculating, for each output unit, a degree of similarity between the input data and the synaptic weight as well as an evaluation function value by causing an optimization problem to correspond to the fired unit positions in the output layer, detecting means for detecting the best matching optimum output unit on the basis of the output of the calculating means, and means for changing the synaptic weights of a group of output units associated with the optimum output unit detected by the detecting means.

Since the optimum output unit is detected not on the basis of a mere evaluation function, but on the basis of an evaluation function plus the degree of similarity between the input data and the synaptic weight, the minimum or maximum point, rather than a local minimum or local maximum, of the evaluation function can be detected, thereby making it possible to detect the optimum unit with a high accuracy. Because of the change of the synaptic weights, or the self-organization of the neural network, the optimum unit (fired unit) position in the output layer changes according to the structure of an optimization problem to be solved. The change takes place so that the evaluation function value (including the degree of similarity) may be minimized or maximized, which makes it possible to obtain a solution to the optimization problem.

With the optimization apparatus according to then present invention, use of the self-organization function of the neural network allows the evaluation function of the optimization problem to be minimized or maximized. As a result of this, it is possible to obtain the optimum solution to the optimization problem at a high speed with a high accuracy.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Referring to the accompanying drawings, optimization apparatus according to embodiments of the present invention will be explained.

Figure 1:
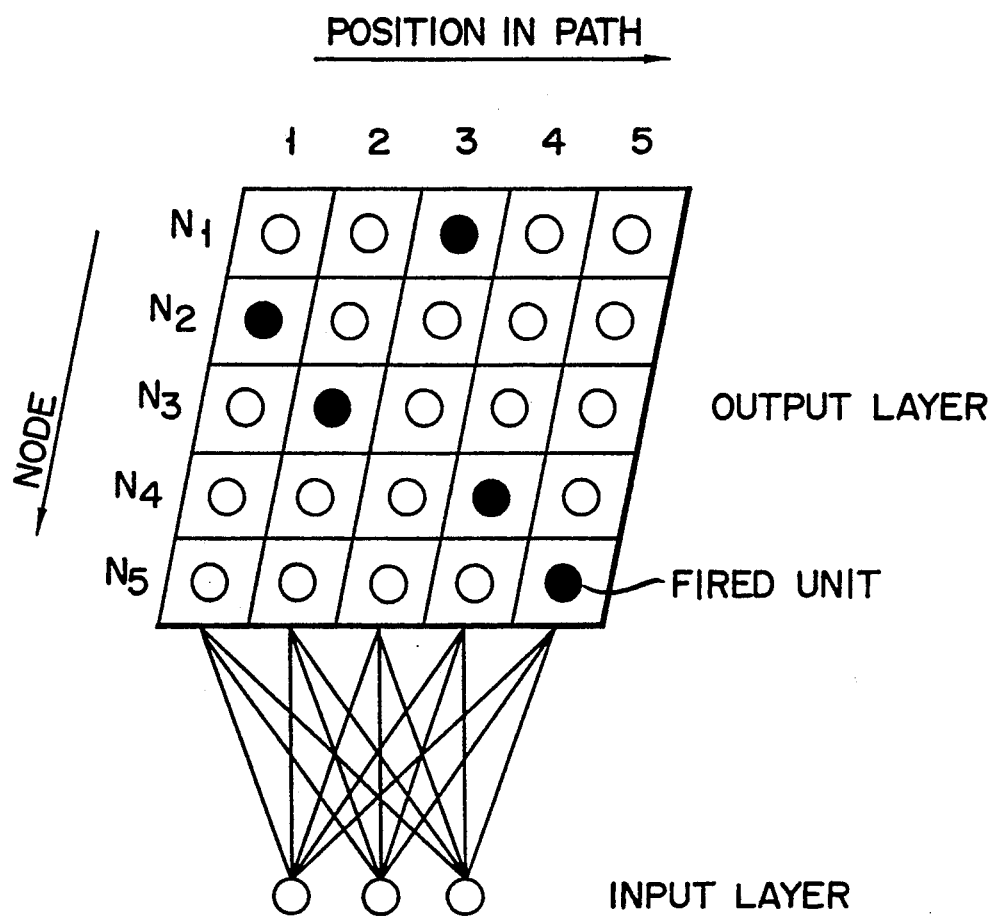
FIG. 1 is a schematic diagram of a neutral network used for solving a traveling-salesman problem according to the present invention.

To begin with, the principle of the present invention will be described FIG. 1 is a conceptual schematic for a layered neural network. An input layer is formed of the same number (three in this case) of units (white circles in the figure) as inputs. An output layer is formed of many units (white and black circles in the figure) arranged in a two-dimensional manner. Each unit of the input layer is connected to each unit of the output layer with a particular synaptic weight. The arrangement of units in the output layer can be changed depending on a type of an optimization problem to be solved. For example, in addition to the configuration of FIG. 1 in which a plurality of units arranged in a two-dimensional manner, a plurality of units can be arranged in a one-dimensional line or ring or in a three-dimensional cube.

In FIG. 1, evaluation functions of an optimization problem to be solved are assigned to the row and column direction of the two-dimensional matrix of units of the output layer. For example, it is assumed to solve a traveling-salesman problem, one of NP(nondeterministic polynomial) complete problems particularly difficult to solve among optimization problems: that is, find the shortest of traveling routes passing through all nodes only once in a network with n nodes (cities) provided that the distance from node i to node j is $d_{ij}$. When the numbers of the nodes are defined in the row direction, and the traveling sequence of the nodes in the column direction, the traveling sequence of the individual nodes is $N_2 \to N_3 \to N_1 \to N_4 \to N_5$ in that order provided that black circles indicate fired units (best matching units or optimum units) in FIG. 1.

The present invention is characterized in that the synaptic weights between the input and output layers of the neutral network are self-organized suitably in order to change the fired unit positions along a direction in which the evaluation function of an optimization problem becomes maximum or minimum.

Figure 2:
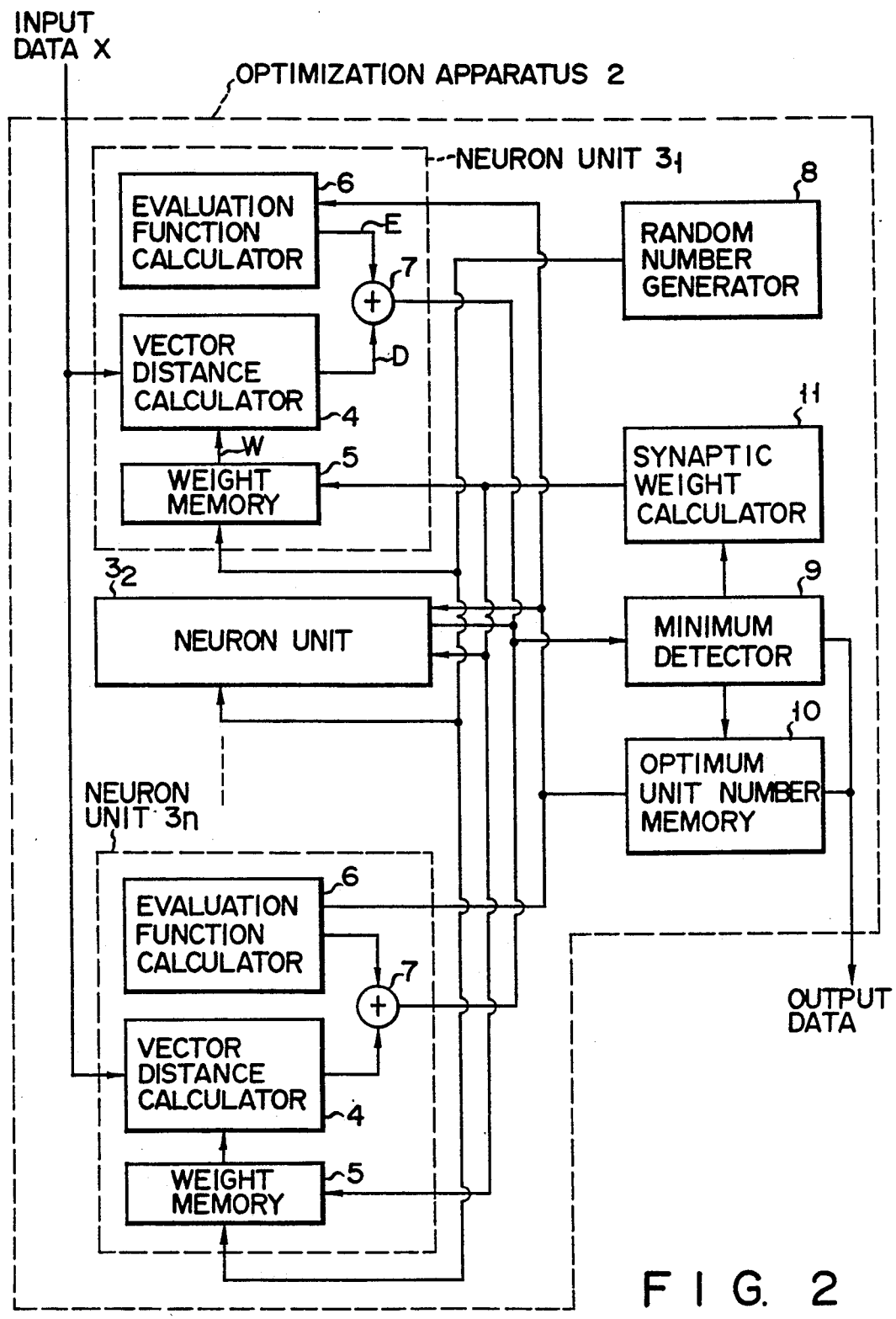
FIG. 2 is a block diagram for an optimization apparatus according to a first embodiment of the present invention.

A block diagram of an optimization apparatus according to a first embodiment of the present invention based on the above-described principle is shown in FIG. 2.

An input data X is supplied to all neuron units $3_j$ (j=1 to n), corresponding to the units in the output layer of FIG. 1, in an optimization apparatus 2 according to the present invention. Each neuron unit $3_j$ is formed of a vector distance calculator 4, a weight memory 5 storing synaptic weights W, and an evaluation function calculator 6 for providing an evaluation function for optimization problems. Although the input layer of FIG. 1 is not shown in FIG. 2, the input data itself may be considered the input layer. If the number of units in the input layer is m, the input data is represented by an m-dimensional vector of $x_1, x_2, \ldots x_m$ as components. The synaptic weights W stored in the memory 5 are initialized by very small random numbers generated at a random number generator 7.

The input data X supplied to each neuron unit $3_j$ is then supplied to the vector distance calculator 4, which calculates the vector distance $D_j$ expressed by the following equation as the degree of similarity between the input data and the synaptic weights $W_j$ ($w_{j1}, w_{j2}, \ldots, w_{jm}$) for each neuron unit $3_j$ read from the memory 5:

$$D_j = \sum_{i=1}^{m} (x_i - w_{ji})^2 \quad (1)$$

where $w_{ji}$ is the synaptic weight from the j-th neuron unit $3_j$ to the i-th input data $x_i$ and j is the neuron unit number.

Based on a predetermined evaluation function and the optimum neuron unit number $C_k$ read from the memory 10, the evaluation function calculator 6 calculates an evaluation function value $E_j$ provided that the neuron unit $3_j$ is a fired unit or the best matching optimum unit. It is to be noted that the function has a convex curve with the top facing downward in order to take the minimum value $E_{min}$ in the optimum state.

Figure 4:
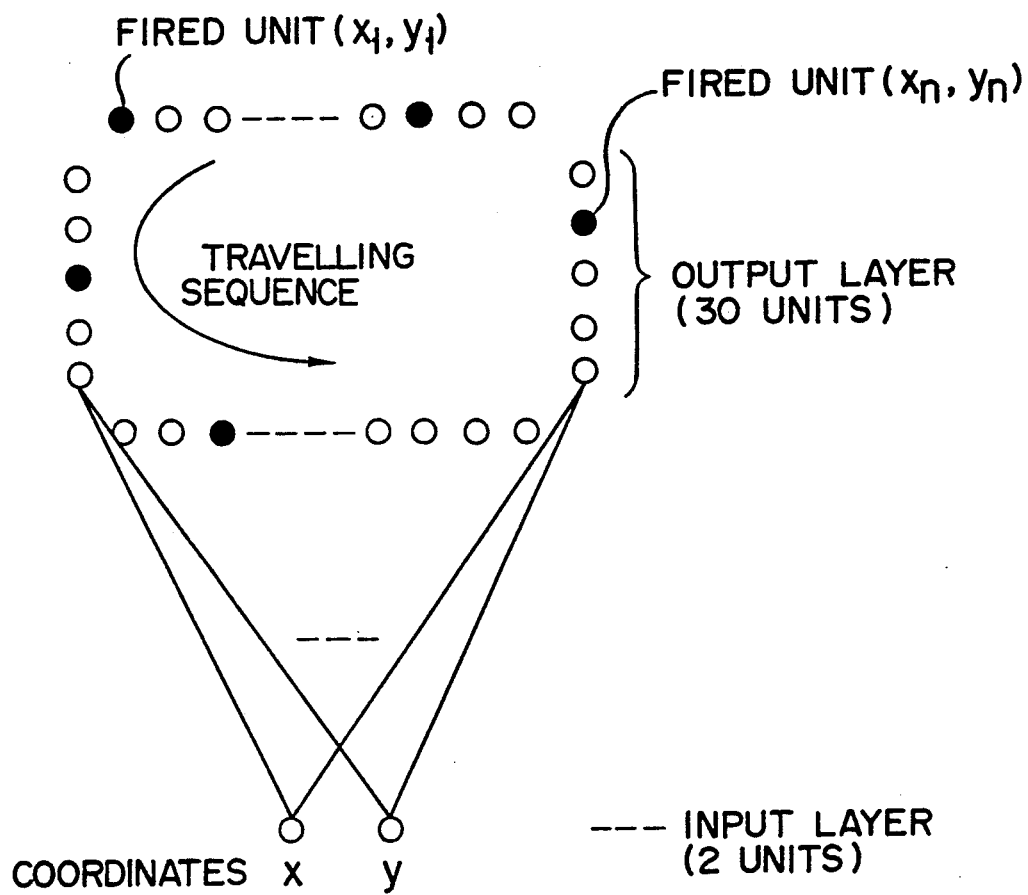
FIG. 4 is a schematic diagram of a neural network used in a simulation system solving a traveling-salesman problem.

One example of the evaluation function is given as follows. It is assumed that the optimization problem is a traveling-salesman problem and the neuron units are arranged on a ring as shown in FIG. 4 (described later). When the two-dimensional coordinates of the cities are given to the every neuron, the best matching unit is fired. A path of a tour is obtained as the order of the fired neuron $C_k$, which corresponds to the city k, on the ring. The energy function (evaluation function) as $C_k$ is on the i-th neuron of the self-organizing layer is defined by:

$$E_{ik} = \alpha \cdot \text{overlap}_{ik} + \beta \cdot [\text{tour\_}d_{ik}(t) - \gamma \cdot \text{min\_tour\_}d(t)]$$

$$\text{overlap}_{ik} = \sum_{k=1, CK \neq C_k} 1(CK) \quad \text{where } 1(CK) = 1 \text{ if } C_k = i$$

$$\text{tour\_}d_{ik}(t) = \sum_{j=1} d_{pjpj+1}$$

$$\text{min\_tour\_}d(t) =$$

$$\text{min}[\text{tour\_}d_{ik}(0), \text{tour\_}d_{ik}(1), \ldots \text{tour\_}d_{ik}(t-1)],$$

$\text{overlap}_{ik}$: The number of overlapping of the other best matching neurons with $C_k$ on the i-th neuron.

$\text{tour\_}d_{ik}(t)$: The tour length when the city k lies on the i-th neuron.

$\text{min\_tour\_d}(t)$: The minimum tour length that has been obtained by the (t−1) steps.

$d_{pjpj+1}$: The distance between two cities, $p_j$ and $p_{j+1}$.

$P = \{p_1, p_2, \ldots p_n\}$: A set of n cities that is arranged in order of increasing value of $C_k$.

The evaluation function described above is a mere example and can be modified freely as long as the function has a convex curve with the top facing downward.

Variables of the function depend on the type of optimization problem; in the case of a traveling-salesman problem, variables are city names and the sequence of visiting them.

The output D of the vector distance calculator 4 and the output E of the evaluation function calculator 6 are both supplied to an adder 7, which supplies to a minimum detector 9 the sum (=D+E) of the vector distance and evaluation function for each neuron unit $3_j$. The minimum detector 9 selects a neuron unit for which the sum is the smallest, thereby enabling the minimum value of the evaluation function to be detected with a high accuracy. The number of the selected neuron unit is stored as the optimum neuron unit number $C_k$ in the memory 10, and at the same time, is supplied to a synaptic weight calculator 11. Based on the supplied optimum neuron unit number, the synaptic weight calculator 11 calculates synaptic weights $W_{ck'}(t+1)$ for a group of neuron units $3C_k'$ associated with the optimum neuron unit $3C_k$, using the following equation, then rewrites the synaptic weights $W_{ck'}$ for the neuron units $3C_k'$ in the memory 5:

$$W_{ck'}(t+1) = W_{ck'}(t) + \alpha(X - W_{ck'}(t)) \quad (2)$$

where $W_{ck}'(t)$ is the synaptic weight before being rewritten, E a constant, and X the input data.

The group of neuron units are a plurality of neuron units in the vicinity of the optimum neuron unit in the output layer within a distance $\gamma$ from the optimum neuron unit.

The above-mentioned operation is repeated until the variation of the optimum neuron unit disappears, or until the neuron unit number $C_k$, which is detected by the minimum detector 9 and stored in the memory 10, remains constant during a specified number of repetitions. The state where the number of the optimum neuron unit makes no variations is defined as the convergent state. The output data in the convergent state, or the minimum output $E_{min}$ of the evaluation function calculator 6 is output as the optimum solution of the optimization problem. At the same time, the variables (city names and visiting sequence of the cities) of the evaluation function used in calculation of minimum value is also output.

As described above, with the first embodiment, by using the self-organizing function of the neural network to update synaptic weights, it is possible to calculate the minimum value of the evaluation function expressing the interrelation between the optimization problem and fired neuron units. This makes it possible to obtain the optimum solution at a high speed with a high accuracy. Since this embodiment utilizes the two-layered neural network, the number of synaptic couplings between the units is smaller than that in the case of interconnection type neural network. For example, if the number of units is 100, the number of synaptic couplings between the units in the case of interconnection type neural network is $100 \times 99/2 = 4950$ and $100 \times 2 = 200$ in the case of this embodiment. Therefore, the amount of calculation and the time required for calculation are shortened.

Figure 3:
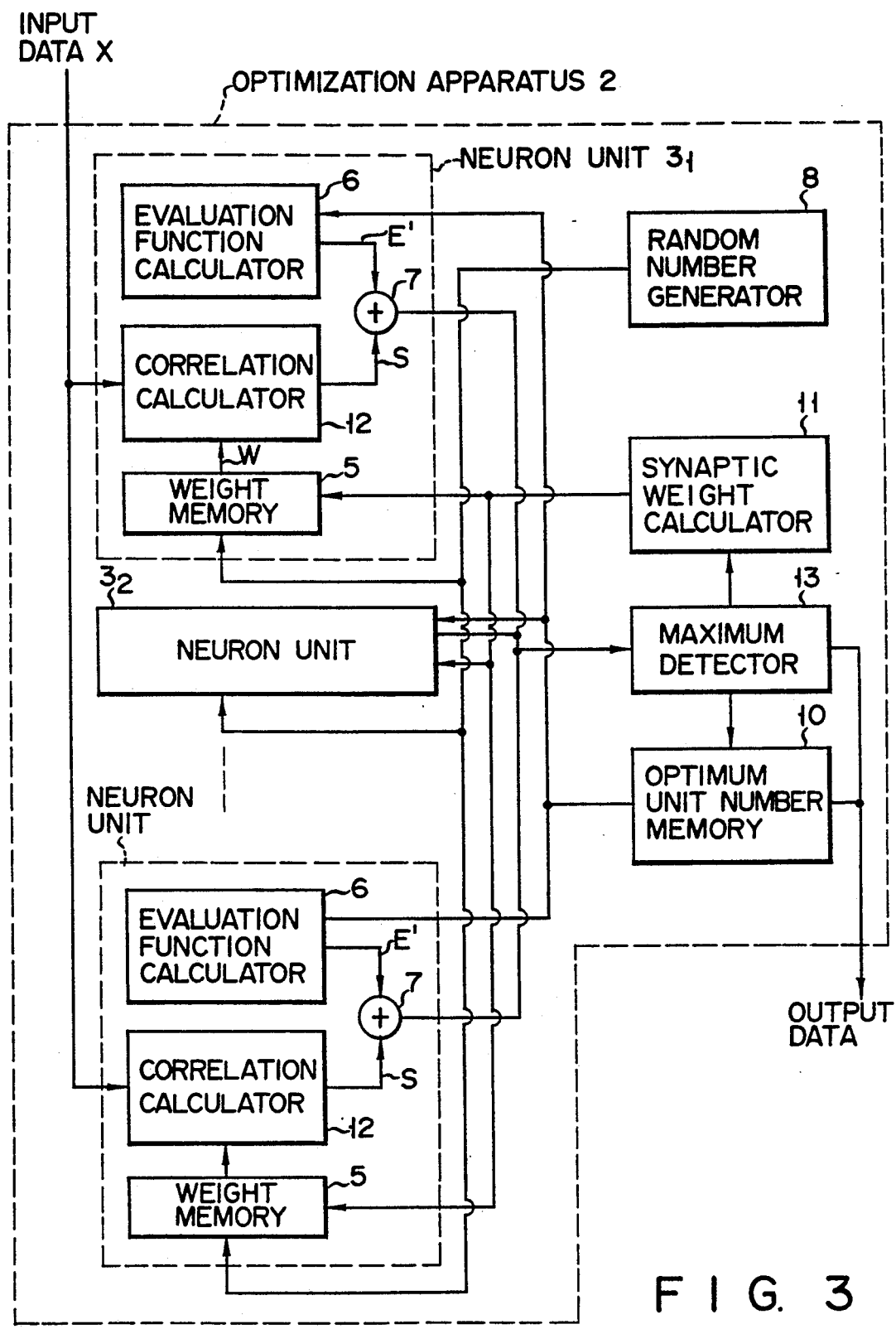
FIG. 3 is a block diagram for an optimization apparatus according to a second embodiment of the present invention.

FIG. 3 is a block diagram of a second embodiment of the present invention. In the first embodiment, the vector distance calculator 4 calculates the vector distance (differential value) as the degree of similarity between the input data X and the synaptic weights W. In contrast, in the second embodiment, a correlation calculator 12 calculates as the degree of similarity the following correlation value between the input data X and the synaptic weight W:

$$S_j = \sum_{i=1}^{m} (x_i \times w_{ji}) / \left( \sqrt{\sum_{i=1}^{m} x_i^2} \times \sqrt{\sum_{i=1}^{m} w_{ji}^2} \right) \quad (3)$$

Unlike the first embodiment, the evaluation function in the second embodiment has a convex curve with the top facing upward in order to take the maximum value in the optimum state. The evaluation function in the second embodiment can be expressed by inverting the sign of the evaluation function used in the first embodiment.

Using such evaluation function, the evaluation function calculator 6 calculates evaluation function values $E_j'$.

The sum $(=S+E')$ of the correlation value S calculated at each neuron unit 3 and the evaluation value E' is supplied to a maximum detector 13, which select a neuron unit 3 for which the sum $S+E'$ becomes maximum.

With the second embodiment, in addition to the same effect as with the first embodiment, use of correlation value, which results in a slight increase in calculation volume, enables more accurate detection of the optimum neuron unit than the first embodiment. The correlation value is a value normalized within a range from $-1$ to $+1$. Therefore, it is easy to judge whether or not the input data is similar to the synaptic weight. The vector distance is a value ranging from 0 to $\infty$.

FIG. 4 illustrate a neural network used in a simulation system solving a traveling-salesman problem. A plurality of neuron units arranged in a one-dimensional ring are used as the output layer. For the input layer, two units to which two-dimensional coordinates x and y of the city are assigned are used. The output layer consists of 30 units including redundant units. When the two-dimensional coordinates x and y of a given city is input to the input layer, one of the units in the output layer is fired (or best-matched). Under these conditions, the shortest distance traveling through ten cities is calculated. The traveling sequence is assumed to be the sequence of the fired units corresponding to individual cities and arranged in a ring.

For comparison's sake, an algorithm to search fully for a total of about 180,000 traveling routes was executed on a supercomputer (FACOM VP-50), and it took about 40 CPU seconds to obtain the result.

In contrast, with this embodiment, the optimum solution is reached in an average of 0.3 CPU second. This difference increases as the number of cities increases. Normally, when the number of cities exceeds 15, the amount of calculations is so large that the full-search algorithm cannot practically deal with it. Even the above supercomputer FACOM VP-50 would take several months to process such an amount of calculations. With this invention, however, it is possible to obtain the optimum solution in as short as several seconds As described above, according to the present invention, it is possible to provide an optimization apparatus capable of obtaining the solution to an optimization problem at a high speed with a high efficiency by using the self-organizing function of the neural network. Furthermore, use of parallel processing of the neural network enables more high-speed operation.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, an optimization problem other than the traveling-salesman problem can be solved in the same manner. The goal of the n-queen problem is to place n chess queens on an $n \times n$ chessboard so that no more than two queens occupy the same row, column, and diagonals. In the case of n queens, a self-organizing layer is an $n \times n$ array of neurons and their every input values is always zero. The best matching neuron $C_i$ on the i-th row is selected by:

$$C_i = arg\ min_j\{ \| W_{ij}(t) \|^2 + E_{ij}\}.$$

The best matching neuron $C_i$ is obtained for each row on the $n \times n$ array, and let $C_i$ be a queen. The energy function of the i-j-th neuron on the self-organizing layer is defined by:

$$E_{ij} = \left( \sum_{\substack{l=1,\\l=i}} O_{lj} + \sum_{\substack{d=1,\\d=i, d-e=i-j}} \sum_{e=1,} O_{de} + \sum_{\substack{d=1,\\d=i d+e=i+j}} \sum_{e=1,} O_{de} \right) \cdot cost_{ij}(t)$$

$$O_{lj} = 1(C_l) \text{ where } \begin{cases} 1(C_l) = 1 \text{ if } C_l = j \\ 1(C_l) = 0 \text{ if } C_l \neq j \end{cases}$$

$$cost_{ij}(t+1) = \alpha \cdot cost_{ij}(t) \quad \text{if } C_i = j$$
$$cost_{ij}(t+1) = \max[\beta \cdot cost_{ij}(t), cost_{ij}(0)] \quad \text{if } C_i \neq j$$

where $\alpha$ ($>1$) and $\beta$ ($<1$) are positive constants. When the i-j-th neuron is the best matching neuron, the synaptic weights vectors of the neurons of the column and both diagonals apart from zero as the self-organization proceeds.

What is claimed is:

1. An optimization apparatus having a layered neural network including an input layer formed of input units and supplied with input data and an output layer formed of output units connected to the individual input units with specified synaptic weights, comprising:
   calculating means for calculating, for each output unit, a sum of a degree of similarity between the input data and the synaptic weight and a given evaluation function value for an optimization problem;
   detecting means for detecting an optimum output unit on the basis of the sum of the degree of similarity and the given evaluation function value output from said calculating means; and
   self-organization means for changing the synaptic weights of a predetermined group of the output units which are in the vicinity of the optimum output unit detected by said detecting means.

2. An apparatus according to claim 1, wherein the degree of similarity calculated by said calculating means is a vector distance between the input data and the synaptic weight, said evaluation function has a convex curve with the top facing downward, and said detecting means detects the minimum value of said sum to find the optimum output unit.

3. An apparatus according to claim 2, wherein said vector distance Dj for a j-th output unit is expressed by the following equation:

$$D_j = \sum_{i=1}^{m} (x_i - w_{ji})^2$$

where
   $x_i$ ($i=1$ to m) is the input data, and
   $w_{ji}$ is the synaptic weight from the j-th output unit to the i-th input data $x_i$.

4. An apparatus according to claim 1, wherein the degree of similarity calculated by said calculating means is a correlation value between the input data and the synaptic weight, wherein said evaluation function has a convex curve with a top facing upward, and wherein said detecting means detects the maximum value of said sum to find the optimum output unit.

5. An apparatus according to claim 4, wherein said correlation value $S_j$ for j-th output unit is expressed by the following equation:

$$S_j = \sum_{i=1}^{m} (x_i \times w_{ji}) / \left( \sqrt{\sum_{i=1}^{m} x_i^2} \times \sqrt{\sum_{i=1}^{m} w_{ji}^2} \right)$$

wherein
   $x_i$ ($i=1$ to m) is the input data, and
   $w_{ji}$ is the synaptic weight from the j-th output unit to the i-th input data $x_i$.

6. A method of solving an optimization problem by using a layered neural network having an input layer formed of input units and supplied with input data and an output layer formed of output units connected to the individual input units with specified synaptic weights, comprising the steps of:
   calculating a sum of a degree of similarity between the input data and the synaptic weight and an evaluation function value for the optimization problem for each output unit;
   detecting an optimum output unit on the basis of said sum;
   changing the synaptic weights of a predetermined group of the output units which are in the vicinity of the optimum output unit; and
   repeating the above three steps until the detection result for the optimum output unit coverages in a specified range.

7. A method according to claim 6, wherein the step for calculating the sum comprises calculating a vector distance between the input data and the synaptic weight as the degree of similarity, wherein said evaluation function has a convex curve with a top facing downward, and wherein said detecting step comprises detecting the minimum value of said sum to find the optimum output unit.

8. A method according to claim 7, wherein said vector distance $D_j$ for j-th output unit is expressed by the following equation:

$$D_j = \sum_{i=1}^{m} (x_i - w_{ji})^2$$

where
   $x_i$ ($i=1$ to m) is the input data, and
   $w_{ji}$ is the synaptic weight from the j-th output unit to the i-th input data $x_i$.

9. A method according to claim 6, wherein the step for calculating the sum comprises calculating a correlation value between the input data and the synaptic weight, wherein said evaluation function has a convex curve with a top facing upward, and wherein said detecting step comprises detecting the maximum value of said sum to find the optimum output unit.

10. A method according to claim 9, wherein said correlation value $S_j$ for a j-th output unit is expressed by the following equation:

$$S_j = \sum_{i=1}^{m} (x_i \times w_{ji}) / \left( \sqrt{\sum_{i=1}^{m} x_i^2} \times \sqrt{\sum_{i=1}^{m} w_{ji}^2} \right)$$

$w_{ji}$ is the synaptic weight from the j-th output unit to the i-th input data $x_i$.

* * * * *